US009293230B2

United States Patent
Hing et al.

(10) Patent No.: US 9,293,230 B2
(45) Date of Patent: Mar. 22, 2016

(54) METHOD FOR SYNTHESIS OF NANO-CRYSTALLINE METAL OXIDE POWDERS

(71) Applicant: UNIVERSITI BRUNEI DARUSSALAM, Gadong (BN)

(72) Inventors: Peter Hing, Gadong (BN); Lim Chee Ming, Gadong (BN); Jung Sang Cheol, Gadong (BN); Low Siaw Huei, Gadong (BN)

(73) Assignee: UNIVERSITI BRUNEI DARUSSALAM, Gadong (BN)

( * ) Notice: Subject to any disclaimer, the term of this patent is extended or adjusted under 35 U.S.C. 154(b) by 228 days.

(21) Appl. No.: 14/253,140

(22) Filed: Apr. 15, 2014

(65) Prior Publication Data

US 2014/0311913 A1 Oct. 23, 2014

(30) Foreign Application Priority Data

Apr. 17, 2013 (BN) .................................. 2013/0040

(51) Int. Cl.
| | | |
|---|---|---|
| *C25B 1/00* | (2006.01) | |
| *C25D 9/00* | (2006.01) | |
| *C25D 11/00* | (2006.01) | |
| *H01B 1/02* | (2006.01) | |
| *C01G 53/04* | (2006.01) | |
| *C25D 9/04* | (2006.01) | |
| *C25D 9/08* | (2006.01) | |
| *C25D 9/06* | (2006.01) | |
| *H01B 3/10* | (2006.01) | |

(52) U.S. Cl.
CPC ........ *H01B 1/02* (2013.01); *C01G 53/04* (2013.01); *C25B 1/00* (2013.01); *C25D 9/04* (2013.01); *C25D 9/06* (2013.01); *C25D 9/08* (2013.01); *H01B 3/10* (2013.01)

(58) Field of Classification Search
CPC .............. C25D 9/04; C25D 9/06; C25D 9/08; C25D 9/10; C25D 9/12; C25D 11/20; C25D 11/18
See application file for complete search history.

(56) References Cited

U.S. PATENT DOCUMENTS

| | | | | |
|---|---|---|---|---|
| 4,067,788 A | * | 1/1978 | Solomon ................ | H01M 4/36 205/349 |
| 4,882,014 A | | 11/1989 | Coyle et al. | |
| 5,417,816 A | * | 5/1995 | Nakashima ............... | C25B 1/00 205/508 |
| 5,993,511 A | * | 11/1999 | Piro ....................... | C22C 1/1026 75/235 |
| 6,030,519 A | * | 2/2000 | Keller ..................... | B44D 3/16 205/705 |
| 6,558,847 B1 | | 5/2003 | Kawakami et al. | |
| 7,700,068 B2 | * | 4/2010 | Shen ...................... | B82Y 30/00 423/594.19 |
| 2010/0101964 A1 | * | 4/2010 | Shindo .................... | C22B 7/001 205/508 |
| 2012/0292561 A1 | | 11/2012 | Sasaoka et al. | |

OTHER PUBLICATIONS

Zhou, G.-T., et al., "Preparation and characterization of nanoplatelets of nickel hydroxide and nickel oxide," *Materials Chemistry and Physics*, 2006, vol. 98, pp. 267-272.

* cited by examiner

*Primary Examiner* — Nicholas A Smith
*Assistant Examiner* — Brian W Cohen
(74) *Attorney, Agent, or Firm* — Greeta Kadambi; Riddhi IP LLC

(57) ABSTRACT

A method for synthesis of nanostructured metal oxide powders. The method comprises converting the metallic material into a precipitate of metal hydroxide by an electrochemical reaction and calcinating the metal hydroxide to form the metal oxides. The method of the invention is also used for the development of cermet particulates and topological insulator particles.

13 Claims, 6 Drawing Sheets

METHOD FOR SYNTHESIS OF NANO-CRYSTALLINE METAL OXIDE POWDERS

CROSS-REFERENCE TO RELATED APPLICATION

This application claims the benefit of Brunei Patent Application No. 2013/0040, filed Apr. 17, 2013, which is hereby incorporated by reference in its entirety.

FIELD OF INVENTION

The present invention relates to a method for synthesis of nano-crystalline metal oxide powders. It also relates to the method for the synthesis of cermet particles and topological insulating particles comprising metal oxide powders.

BACKGROUND

Nanostructured metal oxides have wide application in the areas of SOFCs (Solid Oxide Fuel Cells) wherein the electrodes are made up of solid oxide materials. The physical and chemical structure of a metal oxide varies with the method of preparation as the catalytic activity and electrical conductivity of the metal oxide are strongly dependent on its synthesis.

There are various known methods in the prior art for preparing the nanostructured metal oxide for example by hydrothermal means using water, temperature and pressure in an autoclave or starting with expensive organic/inorganic precursors to effect co-precipitation or electroplating. These methods are well known in the literature but have certain disadvantages such as unsustainable industrial applicability, high cost of metal-organic precursors as starting materials.

Hence, there is a need to provide a low cost, reproducible, and sustainable process which is also industrial applicable for the preparation of nanostructure metal oxides.

SUMMARY

It is an object of the invention to provide a method for synthesis of nanostructured metal oxides.

It is another object of the invention to provide a method for synthesis of metal oxides from a metallic material, wherein the method comprises: converting the metallic material into a precipitate of metal hydroxide by an electrochemical reaction; and calcinating the metal hydroxide to form the metal oxides.

It is yet another object of the invention to provide a system for synthesis of metal oxides from a metallic material, wherein the system comprises: an electrochemical unit to convert the metallic material into a precipitate of metal hydroxide by an electrochemical reaction; and a calcination unit to calcinate the metal hydroxide to obtain the metal oxide.

It is yet another object of the invention to provide a method for the synthesis of nano-structured metal oxide powders that can be further used for the development of topological insulator particles and cermet particulates.

It is yet another object of the invention to provide a method for the synthesis of nano-structured metal oxide powders that can be used as anode materials for solid oxide fuel cells.

It is yet another object of the invention to provide a method for synthesis of a topological insulator particle, wherein the method comprising: preparing a metal oxide core from a metallic material by converting the metallic material into a precipitate of metal hydroxide by electrochemical reaction and calcinating the metal hydroxide to form the metal oxide core; and reducing outer surface of the metal oxide core to form a conducting shell thereby forming the topological insulator particle. The metal oxide core acts as insulator and a shell acts as conductor.

It is yet another object of the invention to provide a method for synthesis of a cermet particulate, wherein the method comprises: depositing a metal hydroxide layer on a particulate material in an electrochemical unit, wherein the metal hydroxide is prepared by an electrochemical reaction of a metallic material; calcinating the metal hydroxide layer to form a metal oxide layer; and reducing the metal oxide layer to form a conducting shell thereby forming the cermet particulate. The particulate material acts as an insulating core and the shell acts as a conductor.

It is yet another object of the invention to provide a method for the synthesis of nano-structured metal oxide powders in which the metallic material is selected from alloy, powder, wire, rod or plate.

It is yet another object of the invention to provide a low cost method for the synthesis of highly reactive nano-structured metal oxide powders wherein the materials used are of low cost and are commonly available laboratory chemicals.

DETAILED DESCRIPTION

Figure 1A:
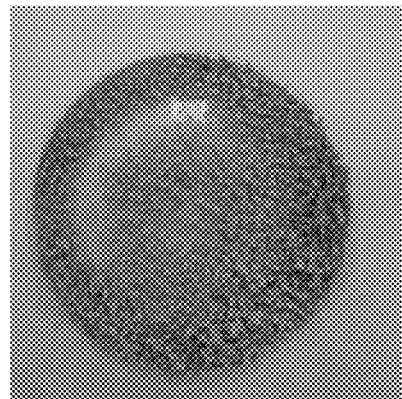
FIG. 1(a) illustrates the image of precipitates of sample 1 after electric dissolution.

In the detailed description of the present invention, numerous specific details are described to provide a thorough understanding of the various embodiments of the present invention. However, a person skilled in the relevant art will recognize that an embodiment of the present invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

It must be noted that as used herein and in the appended claims, the singular forms "a", "an", and "the" include plural referents unless the context clearly dictates otherwise. Thus, for example, reference to "an individual" includes one or more individuals and reference to "the method" includes reference to equivalent steps and methods known to those skilled in the art, and so forth.

Generally metal oxides have widespread applications viz electrodes in SOFCs (Solid Oxide Fuel Cells), elements for fabrication of cermets (composite of ceramic and metals), synthesis of topological insulator etc. Pure nickel oxide is electrically non-conducting but when doped with small addition of lithium ions is known to be a highly electrically conducting material. Dense nickel oxide can also be used as target for RF/DC sputtering or co-sputtering with other targets such as cerium oxide, indium oxide, and tin oxide to produce thin transparent electrodes for energy conserving devices. Further, the nickel oxide can also be used to produce invar and elinvar alloys, thin firm sensors, varistors, thermistors, cathodes for rechargeable batteries, pigments to ceramics, glasses glazes, photocatalysts and so on.

In the prior art, various methods were provided for preparation of metal oxide viz, hydrothermal method, co-precipitation method, electroplating etc. These methods require a lot of capital investment; also the sustainability was also a question. But the present invention provides a cost effective, sustainable and an easily reproducible method involving corrosion of the starting material made up of metal/mixed metals by electric dissolution.

The present invention relates to a method for synthesis of metal oxides from a metallic material, wherein the method comprises: converting the metallic material into a precipitate of metal hydroxide by an electrochemical reaction; and calcinating the metal hydroxide to form the metal oxides. The metallic material is selected from alloy, powder, wire, rod, plate.

In an embodiment of the invention, the metallic material comprises at least one inorganic metal, wherein the metals have standard electrode potential below than that of hydrogen ($E_o$=0V). The inorganic metal can be selected from the group comprising of nickel, aluminum, copper, cobalt, iron, tin, antimony, magnesium, titanium, nickel, cerium, gadolinium, lanthanum, strontium, gallium or a mixture thereof. Further, the materials used in the invention are of low cost and commonly available laboratory chemicals thereby making the method industrially viable and cost effective.

In another embodiment of the invention, the electrochemical reaction takes place in an electrochemical unit comprising at least one anode, at least one cathode and an electrolyte.

In another embodiment of the invention, the metallic material acts as cathode in the electrochemical unit. In this case the anode is made up of platinum or platinum-rhodium, or any other conducting material.

In another embodiment of the invention, the metallic material acts as anode in the electrochemical unit. In this case the cathode is made up of platinum or platinum-rhodium, or any other conducting material.

In another embodiment of the invention, the metallic material acts as a metallic powder dissolved in the electrolyte in the electrochemical unit. In this case both the anode and cathode can be platinum or platinum-rhodium wires, or any conducting materials.

In another embodiment of the invention, the synthesized metal oxide is of nanometer size.

In another embodiment of the invention, the metallic material is converted into a precipitate of its hydroxide form by electrically dissolving in an electrochemical unit. The electrochemical unit comprises an electrolyte, with at least one anode along with at least one cathode immersed in the electrolyte. The electrolyte is any conducting liquid preferably aqueous alkyl halide. In the present invention, NaCl is used as the electrolyte in the electrochemical unit. After the electric dissolution step, the NaCl is removed from the precipitates (metal hydroxides) by washing with distilled water and/or ethanol thoroughly, till the conductivity of the drained water comes down close to that of the distilled water. After a long sedimentation time, the residue is dried for several hours at around 70° C. to minimize the agglomeration of the precipitates. After the precipitation of the metal hydroxide in the electrochemical unit, it is calcinated to form the nano-structured metal oxides.

In another embodiment of the invention, the calcination of the metal hydroxide formed after the electric dissolution of the metallic material is done at a temperature of 200° C. to 1200° C.

In another embodiment of the invention, the nano-structured metal oxide formed is crystalline in nature and the crystalline nature of the metal/mixed metal oxide (product) is confirmed by XRD patterns (X-Ray Diffraction). It was observed that the peaks become sharper as the calcination temperature increases. At 200° C., broadening of the XRD peaks is observed, indicating that the crystalline size is in nano range. The calculation of the particle size from the broadening of the XRD peaks indicates that the particle size of the synthesized metal oxide is of 10 nm order. It ranges from about 10 nm to about 90 nm for calcination from 400° C. to 1000° C.

The invention also relates to a system for synthesis of metal oxide from a metallic material as an embodiment of the invention. The system comprises an electrochemical unit, to convert the metallic material into a precipitate of metal hydroxide by an electrochemical reaction; and a calcination unit, to calcinate the metal hydroxide to obtain the metal oxide.

In another embodiment of the present invention, the method for the synthesis of the metal oxides can be used to develop a core-shell composite structure, with easily reducible metal oxide shell. These type of core-shell composite with insulating core and conducting metallic shell can be described as topological insulator particles. These particles posses interesting quantum mechanical properties.

The method for the synthesis of the topological insulator particle is characterized in the steps comprising: preparing a metal oxide core from a metallic material by converting the metallic material into a precipitate of metal hydroxide by electrochemical reaction and then calcinating the metal hydroxide to form the metal oxide core; and reducing the outer surface of the metal oxide core to form a conducting shell thereby forming the topological insulator particle. The synthesized topological insulator particle is of nanometer size.

In another embodiment of the invention, the method for the synthesis of the metal oxides can also be used to develop cermet particulate. A cermet particulate is a composite material composed of ceramic (cer) and metallic (met) materials. It is ideally designed to have the optimal properties of both a ceramic, such as high temperature resistance and hardness, and those of a metal, such as the ability to undergo plastic deformation. These cermet particulates are used for the fabrication of electrolyte and anode for solid oxide fuel cells.

The method for the synthesis of the cermet particulate comprises: depositing a metal hydroxide layer on a particulate material in an electrochemical unit, wherein the metal hydroxide is prepared by an electrochemical reaction of a metallic material; calcinating the metal hydroxide layer to form a metal oxide layer; and reducing the metal oxide layer to form a conducting shell over the particulate material and thereby forming the cermet particulate. The particulate material used for the synthesis of cermet particulate is in contact with the electrolyte of the electrochemical unit. The cermet particulate consists of an insulating core and a conducting shell. The particulate material acts as an insulating core and the shell acts as a conductor. The particulate material used for the synthesis of cermet particulate is selected from the group comprising of yttria stabilized zirconia (YSZ), ceria (CeO2), gadolinium doped ceria (GDC), alumina (Al2O3), and lantanum strontium manganese oxide (LSM). The metallic material used for the synthesis of the cermet particulate is selected from the group consisting of nickel, aluminum, copper, cobalt, iron, tin, antimony, magnesium, titanium, nickel, cerium, gadolinium, lanthanum, strontium, gallium or a mixture thereof.

In another embodiment of the invention, the metallic material used for the synthesis of the cermet particulate can act as cathode or anode or a powder dissolved in the electrolyte of the electrochemical unit.

In another embodiment of the invention, the method can be used to extract reactive metallic hydroxides from alloys. For example, in a Golf driver (a titanium-aluminum-magnesium alloy) aluminum is preferentially electrically dissolved to form predominantly aluminum hydroxide with traces of magnesium. The titanium in the alloy is not electrically dissolved under the experimental conditions used, as it has a high negative electrode potential. XRD shows that gamma alumina with cubic structure and alpha alumina with hexagonal crystal structure are present when the nanocrystalline aluminum hydroxide oxide with high surface areas are calcined below 1000° C. in air.

In another embodiment of the invention, the dispersing agent is added to the electrolyte in the electrochemical unit. A dispersant or a dispersing agent or a plasticizer or a super plasticizer is either a non-surface active polymer or a surface-active substance added to a suspension, usually a colloid, to improve the separation of particles and to prevent settling or clumping. In the present invention, Darvan 811 is the dispersing agent added to improve the separation or to prevent the clumping of the nano-structured metal hydroxides formed.

Figure 1B:
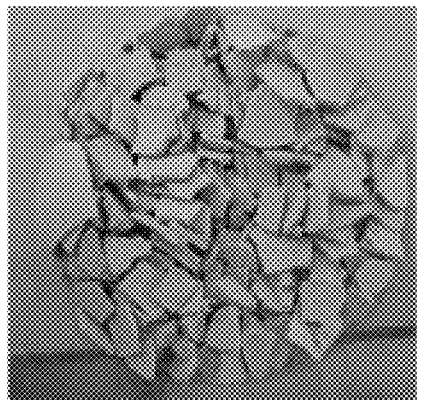
FIG. 1(b) illustrates the image of precipitates of sample 2 after electric dissolution.
Figure 1C:
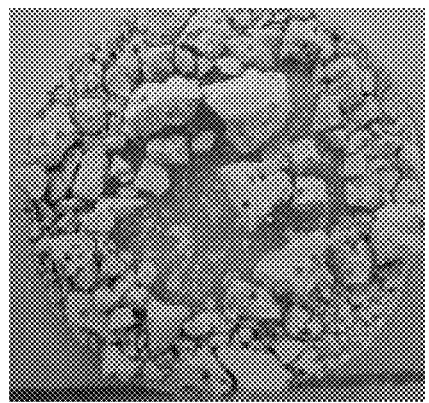
FIG. 1(c) illustrates the image of precipitates of sample 3 after electric dissolution.

An experiment was carried out to check the effect of the dispersing agent on the electrochemical dissolution of the nickel. Three samples were taken and in Sample 1, water was added as solvent with no dispersant. In Sample 2, 2-3 drops of dispersant (Darvan 811) was added with water as solvent and in Sample 3, 2-3 drops of dispersant was added with water+ethanol as solvent. After the electrochemical reaction of the three samples, the physical properties of the precipitates (nickel hydroxide) formed in the three samples were studied. The precipitate of Sample 1 was dark green and it was hard. The precipitate of Sample 2 was bluish green and it was mild hard whereas the precipitate of Sample 3 was light green and it was soft. FIG. 1(a), FIG. 1(b) and FIG. 1(c) illustrates the images of the precipitates (nickel hydroxides) of sample 1, sample 2 and sample 3 respectively. The softness of the precipitate of sample 3 is due to the addition of Darvan in addition of Ethanol as solvent.

Following table summarizes the effect of the dispersing agent on the electrochemical dissolution of the nickel.

TABLE 1

|  | Sample 1 | Sample 2 | Sample 3 |
| --- | --- | --- | --- |
| Dispersant (Darvan 811) | 0 | 2-3 drops (Stirring) | 2-3 drops (Stirring) |
| Solvent | Water | Water | Water + Ethanol |
| Color (Appearance) | Dark green (Hard) | Bluish green (Mild hard) | Light green (Soft) |

The Darvan as dispersant and ethanol as a solvent for washing the precipitates did not affect the phases and crystal structures of the nickel hydroxide formed. This explains the activity of the dispersing agent in the electrochemical reaction.

Figure 2:
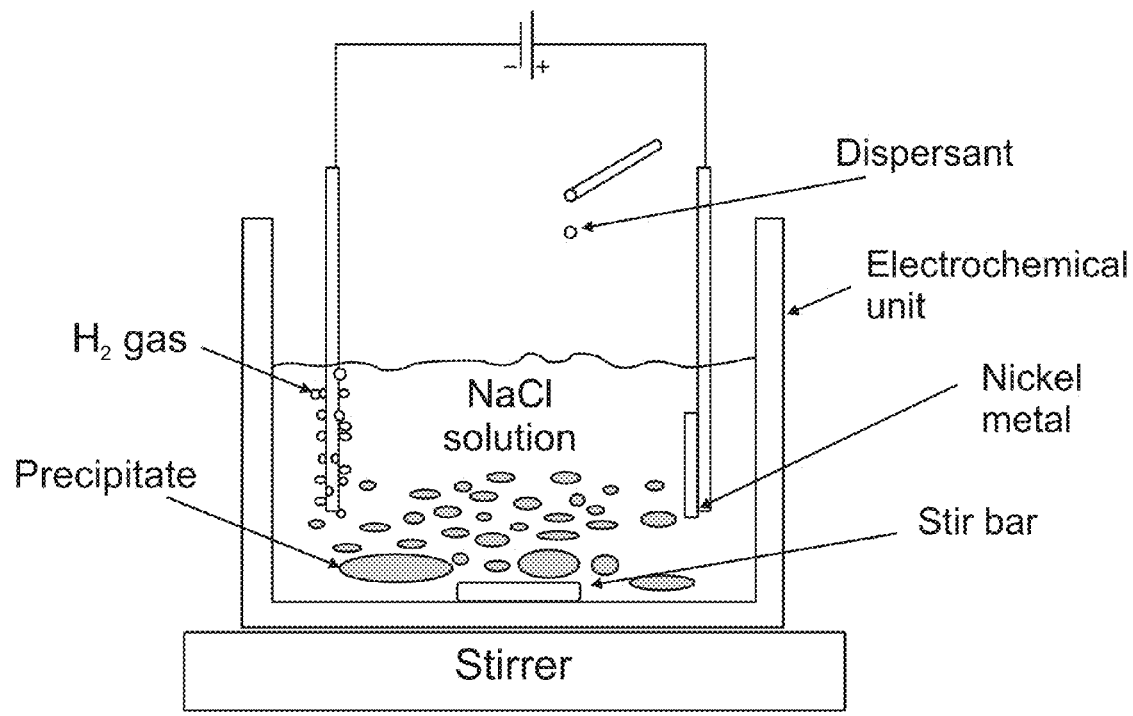
FIG. 2 illustrates an experimental setup for electric dissolution.

FIG. 2 shows an experimental setup for electric dissolution of the metallic material (nickel) to obtain nickel hydroxide as precipitate. 0.5% wt NaCl solution is used as electrolyte with platinium wire as the cathode and nickel wire (purity 99.99%, Dia. 1 mm) is attached to anode. The electric dissolution of the three samples namely (sample 1, sample 2 and sample 3) was done separately. The electrochemical unit is kept on a stirrer with a magnetic stirrer in the solution. The distance between two electrodes is kept about 5 cm apart. An electric current of 100-200 mA is passed through the medium and about 1 g of nickel wire was dissolved. The voltage applied is 30V. This electric dissolution of nickel yields nickel hydroxide as precipitate, which is then calcinated to form nickel oxide.

Figure 3A:
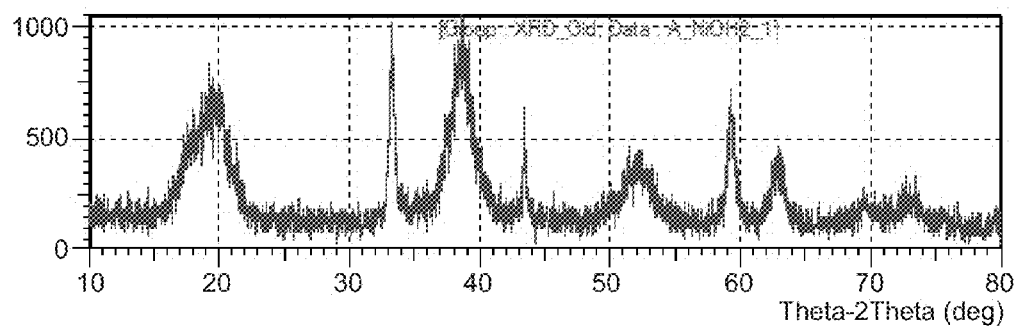
FIG. 3(a) illustrates the XRD pattern of precipitates of sample 1 after electric dissolution at 70° C.
Figure 3B:
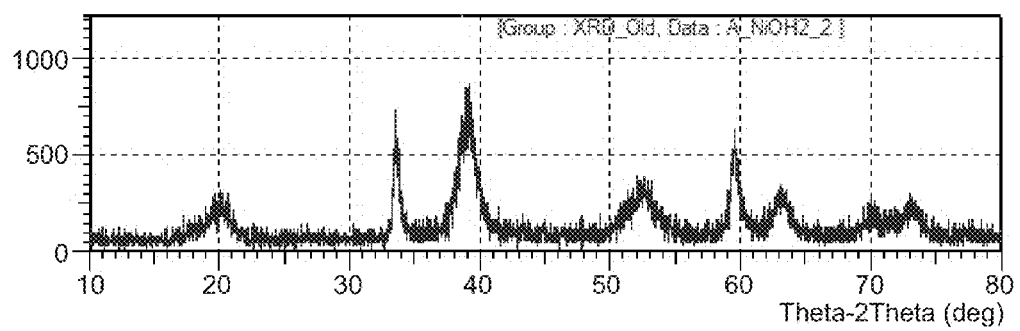
FIG. 3(b) illustrates the XRD pattern of precipitates of sample 2 after electric dissolution at 70° C.
Figure 3C:
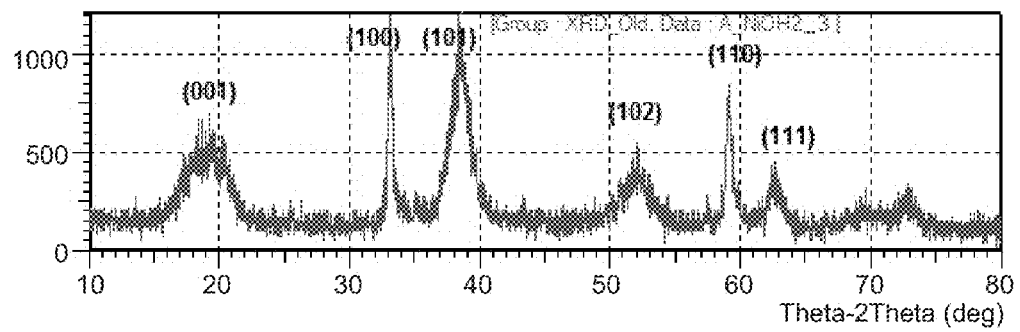
FIG. 3(c) illustrates the XRD pattern of precipitates of sample 3 after electric dissolution at 70° C.

FIG. 3(a), FIG. 3(b) and FIG. 3(c) illustrates the XRD pattern of precipitates of the sample 1, sample 2 and sample 3 respectively at 70° C. The peaks positions of the precipitates of the three samples coincide but the relative intensities are slightly different. However, the patterns of overall peaks correspond to the one of Ni (OH)$_2$ with a hexagonal structure (ICDD card No. 00-001-1047). The peaks seem to be appreciably broad, which indicates amorphous structures or nano-sized particles.

Figure 4:
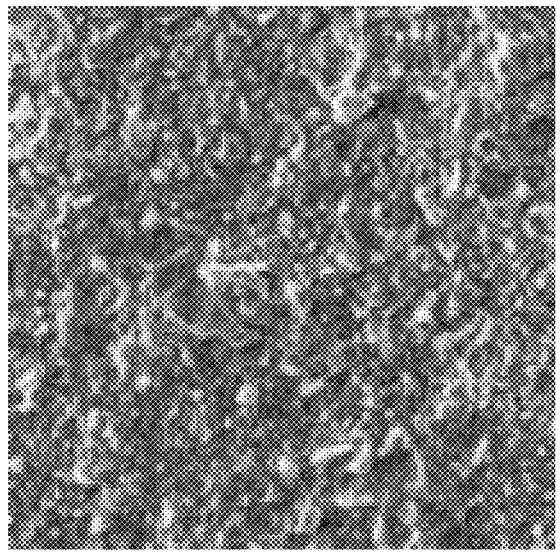
FIG. 4 illustrates an image of dense sintered nickel oxide.

In an exemplary embodiment, the method of the invention is used for the preparation of sintered nano size Nickel Oxide (NiO) powder shaving density above 90%. The Nickel Oxide (NiO) powders can be used as target for RF/DC sputtering or co sputtering with other targets such as dense cerium oxide, indium oxide, tin oxide to produce thin transparent electrodes for energy conversion devices. FIG. 4 illustrates an image of dense nickel oxide with density ranging from 5.5 g/cc to 5.70 g/cc i.e. above 95% when sintered at 1200° C. in air.

The method of the present invention as described is cost effective, reproducible and sustainable. The method is industrially applicable and involves basic metallic materials as raw materials for the synthesis of pure metal oxides.

Several variations in the methods herein disclosed will suggest themselves to those skilled in the art. However, it is to be understood that the present disclosure relates to the preferred embodiment of the invention which is for purposes of illustration only and not to be construed as limiting the scope of the invention.

The present invention will now be illustrated in greater detail with reference to Examples, but the present invention should not be interpreted as being restricted thereto.

EXPERIMENTAL SECTION

Example 1

In an electrochemical unit, the anode was Nickel wire, the cathode was platinum-rhodium wire and the electrolyte was NaCl.

Following are the reactions taken place in the electrochemical unit:

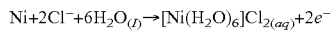

Equation 1

Reduction at Cathode (Pt—Rh Electrode)

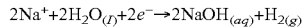

Equation 2

Precipitation

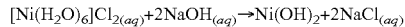

Equation 3

Overall Reaction

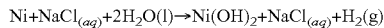

Due to chloride ion in the electrolyte, the nickel metal was corroded away into the hexaaqua Nickel(II) ion, $[Ni(H_2O)_6]^{2+}_{(aq)}$ by passing an electric current through the electrolyte (Equation 1). Meanwhile, hydrogen ions were released from the electrolyte as hydrogen gas making the electrolyte solution alkaline (Equation 2). Mixed with this aqueous alkali, the hexaaqua Nickel (II) ions form a green precipitate of Nickel (II) hydroxide (Equation 3).

It was calculated that 1.07 g of nickel wire produced 1.704 g of the green powder. This was very close to the theoretical weight of Nickel hydroxide expected; hence it is found that the green powder was nickel hydroxide. After the formation of nickel hydroxide, calcination was done to convert nickel hydroxide into nickel oxide.

Figure 5A:
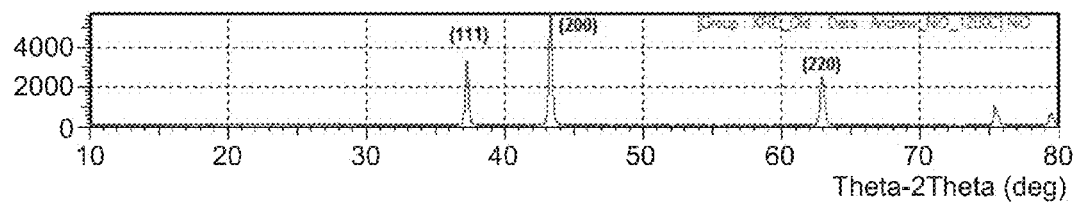
FIG. 5(a) illustrates the XRD patterns of the calcined precursor (nickel hydroxide) at 1200° C.
Figure 5B:
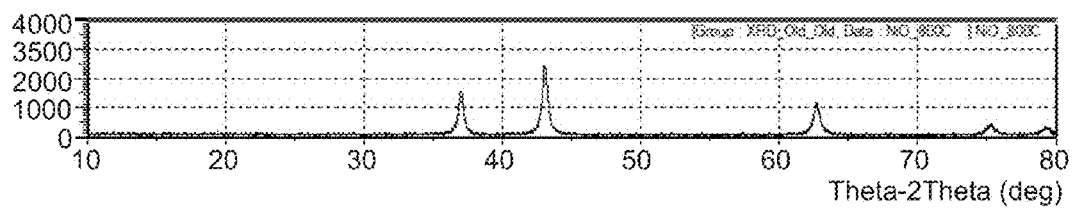
FIG. 5(b) illustrates the XRD patterns of the calcined precursor (nickel hydroxide) at 800° C.
Figure 5C:
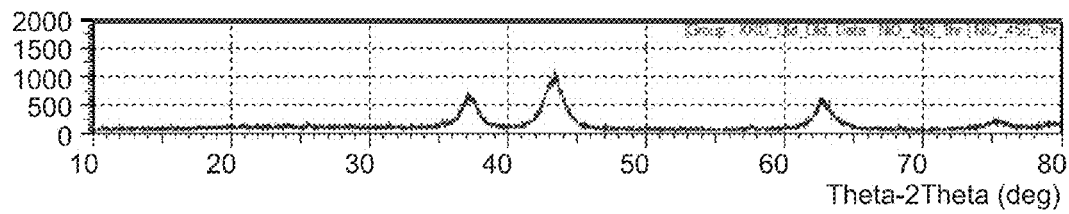
FIG. 5(c) illustrates the XRD patterns of the calcined precursor (nickel hydroxide) at 450° C.
Figure 5D:
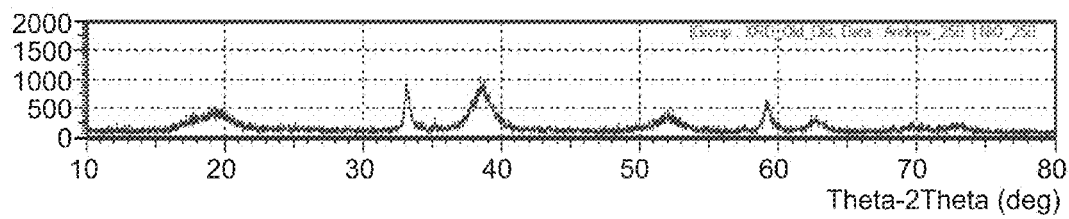
FIG. 5(d) illustrates the XRD patterns of the calcined precursor (nickel hydroxide) at 250° C.
Figure 5E:
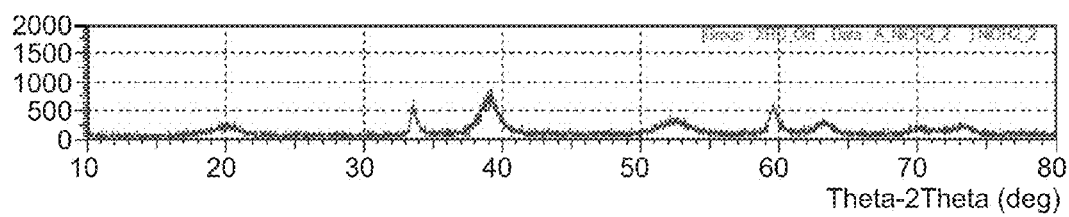
FIG. 5(e) illustrates the XRD patterns of the calcined precursor (nickel hydroxide) at at 70° C.

FIG. 5(a) to FIG. 5(e) shows the phase transition of $Ni(OH)_2$ into NiO by increasing the calcination temperature up to 1200° C. A phase change occurs at temperature between 250° C. and 450° C. The decomposition temperature of $Ni(OH)_2$ is close to 230° C., where it starts to decompose into NiO and $H_2O$. XRD patterns of the calcined precursor (nickel hydroxide) at 1200° C., 800° C., 450° C., 250° C., 70° C. are shown in FIG. 5(a) to FIG. 5(e) respectively. XRD patterns of the calcined precursor at 1200° C., 800° C., and 450° C., as shown in FIG. 5(a), FIG. 5(b) and FIG. 5(c) respectively, match the ICDD card No. 01-071-1179, identifying them as NiO (Bunsenite) with cubic structure. The peaks are sharp for calcination above 800° C., indicating appreciable growth in the crystalline sizes of NiO.

Calcination of the nickel hydroxide obtained by the electrochemical process in vacuum was carried out form 200° C. to 400° C. This yields crystalline green nickel oxide of size around 10 nm or so.

Following table shows the transition from Nickel hydroxide to NiO Crystal:

TABLE 2

| Crystals | hkl | 70° C. | 250° C. | 450° C. | 800° C. | 1200° C. |
|---|---|---|---|---|---|---|
| $Ni(OH)_2$ | 001 | 8.8 | 0.0 | — | — | — |
| | 100 | 19.8 | 76.7 | — | — | — |
| | 101 | 6.0 | 8.5 | — | — | — |
| | 102 | 7.6 | 12.3 | — | — | — |
| | 110 | 17.5 | 45.5 | — | — | — |
| NiO | 111 | — | — | 12.4 | 43.4 | 100.3 |
| | 200 | — | — | 6.9 | 36.9 | 112.0 |
| | 220 | — | — | 11.1 | 45.4 | 75.6 |
| | 311 | — | — | 11.1 | 32.0 | 101.0 |
| | 222 | — | — | 20.7 | 29.8 | 72.0 |
| Average size (nm) | | 12.0 | 35.8 | 12.4 | 37.5 | 92.18 |

It can be seen in Table 2 that the nickel hydroxide crystallite increases from 12 to 36 nm as the calcination temperatures increase from 70° C. to 250° C. From 450° C. to 1200° C., the nickel oxide crystallite increases from 12 nm to 92 nm.

Example 2

The method of the invention can be used to fabricate NiO—YSZ (cermet particulates).

In the electrochemical unit, submicron YSZ (Ytrria Stabilized Zirconia) powder were mixed with nickel powder in the electrolyte (NaCl) solution, and the platinum anode and cathode are in contact with the mixed YSZ and Ni. The nickel powders are dissolved electrically into highly reactive nickel hydroxide and coat the YSZ powders. The conversion of nickel hydroxide to nickel oxide starts as low as 250° C., forming nanostructured nickel oxide on the YSZ.

Subsequent sintering at 1280° C. produces green YSZ—NiO composite suitable for the fabrication of YSZ—Ni cermets. Green color YSZ—NiO can also be used directly for anode, as the material will become YSZ—Ni on exposure to hydrogen and carbon bearing fuel like methane, natural gas, or propane from 500° C. to 750° C. To date porosity of over 30% has been obtained when sintered at 1280° C. in air. Exposure of YSZ—NiO to obtain flame indicates that the nickel oxide is easily reduced to Ni forming YSZ—Ni useful as anode for SOFCs (Solid Oxide Fuel Cells).

Figure 6A:
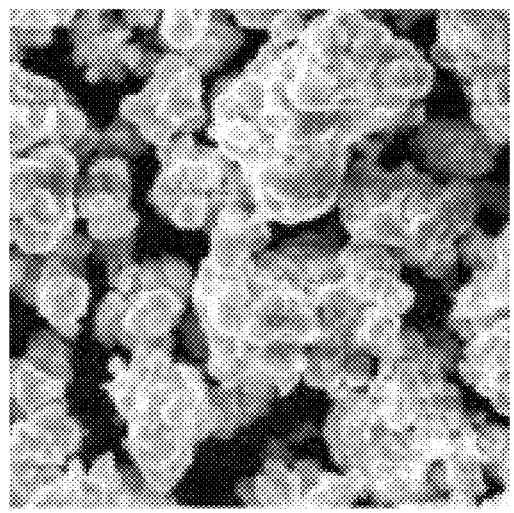
FIG. 6(a) illustrates the image of YSZ powders obtained from electric dissolution of nickel wire.
Figure 6B:
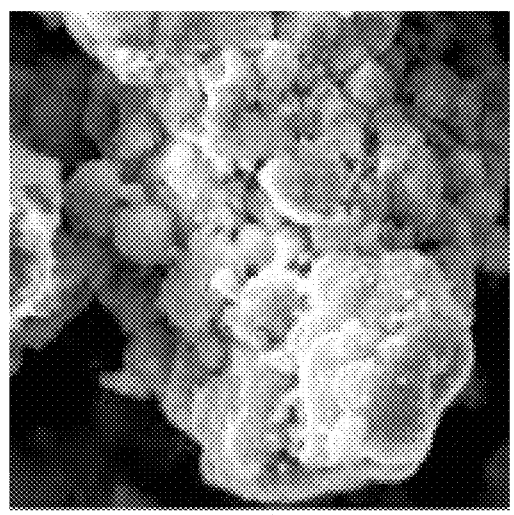
FIG. 6(b) illustrates the image of YSZ powders coated with the nanostructured nickel obtained from electric dissolution of nickel wire.

FIG. 6(a) illustrates the YSZ powders and FIG. 6(b) illustrates YSZ powder coated with the nanostructured nickel obtained from electric dissolution of nickel wire.

Example 3

The method of the present invention can also be applied to form metal oxide-metal composites particles like aluminum oxide-nickel particles. The aluminum oxide serves as core whereas the nickel acts as the shell. The electric dissolution of high purity aluminum wire (99.99%) forms aluminum hydroxide. The nickel hydroxide from the electric dissolution of the nickel is then allowed to disperse in the aluminum hydroxide precipitates to form an intimate mixture of nickel hydroxide over aluminum hydroxide precipitates. Calcination of the mixture yields another mixture of nickel oxide and over aluminum oxide. The reduction of the nickel oxide forms a nano composite of aluminum oxide-nickel particles with aluminum oxide as core and nickel as shell over it. These types of particles have high catalytic activity as the surface areas is well above 100 m²/g.

What is claimed is:

1. A method for synthesis of a topological insulator particle, wherein the method comprises:
   a) preparing a metal oxide core from a metallic material, wherein the preparation comprises:
      i) converting the metallic material into a precipitate of metal hydroxide by electrochemical reaction; and
      ii) calcinating the metal hydroxide to form the metal oxide core; and
   b) reducing the outer surface of the metal oxide core to form a conducting shell thereby forming the topological insulator particle.

2. The method according to claim 1, wherein the metal oxide core of the topological insulator particle acts as an insulator and the shell acts as a conductor.

3. The method according to claim 1, wherein the metallic material is selected from alloy, powder, wire, rod or plate.

4. The method according to claim 1, wherein the metallic material comprises at least one inorganic metal.

5. The method according to claim 1, wherein the metallic material comprises at least one metal having standard electrode potential below that of hydrogen ($E_o$=0V).

6. The method according to claim 1, wherein the metallic material comprises at least one metal selected from the group consisting of nickel, aluminum, copper, cobalt, iron, tin, antimony, magnesium, titanium, cerium, gadolinium, lanthanum, strontium, gallium and a mixture thereof.

7. The method according to claim 1, wherein the electrochemical reaction takes place in an electrochemical unit comprising at least one anode, at least one cathode and an electrolyte.

8. A method for synthesis of cermet particulate, wherein the method comprises:
   a) depositing a metal hydroxide layer on a particulate material in an electrochemical unit, wherein the metal hydroxide is prepared by an electrochemical reaction of a metallic material;
   b) calcinating the metal hydroxide layer to form a metal oxide layer; and
   c) reducing the metal oxide layer to form a conducting shell, thereby forming the cermet particulate.

9. The method according to claim 8, wherein the particulate material acts as an insulating core and the shell acts as a conductor.

10. The method according to claim 8, wherein the particulate material is selected from the group consisting of yttria stabilized zirconia (YSZ), ceria ($CeO_2$), gadolinium doped ceria (GDC), alumina ($Al_2O_3$), and lantanum strontium manganese oxide (LSM).

11. The method according to claim 8, wherein the metallic material is alloy, powder, wire, rod or plate.

12. The method according to claim 8, wherein the metallic material comprises at least one metal selected from the group consisting of nickel, aluminum, copper, cobalt, iron, tin, antimony, magnesium, titanium, cerium, gadolinium, lanthanum, strontium, gallium and a mixture thereof.

13. The method according to claim 8, wherein the metallic material acts as an electrolyte and is mixed with the particulate material in the electrochemical unit.

* * * * *